United States Patent [19]
Oldshue

[11] 3,802,981
[45] Apr. 9, 1974

[54] METHOD OF MAKING AN INFLATABLE TUBE WITH AN ELASTOMERIC INFLATING VALVE

[76] Inventor: James Y. Oldshue, 141 Tyringham Rd., Rochester, N.Y. 14617

[22] Filed: Apr. 28, 1971

[21] Appl. No.: 82,506

Related U.S. Application Data

[63] Continuation of Ser. No. 750,716, June 8, 1968, abandoned, Substitute for Ser. No. 514,174, Dec. 13, 1965, abandoned.

[52] U.S. Cl.................................. 156/120, 152/429
[51] Int. Cl............................................. B29h 15/00
[58] Field of Search..................................... 156/120

[56] References Cited
UNITED STATES PATENTS

| 558,132 | 4/1896 | Weber | 156/120 X |
|---|---|---|---|
| 2,120,346 | 6/1938 | Becker | 156/120 |
| 2,152,373 | 3/1939 | Bronson | 156/120 X |
| 2,573,609 | 10/1951 | Robinson | 156/120 |
| 2,734,011 | 2/1956 | Robinson | 156/120 |

*Primary Examiner*—Clifton B. Cosby

[57] ABSTRACT

A method of bonding an all-elastomeric valve onto the base portion of a metal-core valve in a conventional inner tube to give an inflatable elastomeric tube which can be inflated to any desired size outside of a confining casing, so it can withstand extreme stretching, elongation, deformation, and twisting.

6 Claims, 3 Drawing Figures

PATENTED APR 9 1974     3,802,981

INVENTOR.
JAMES Y. OLDSHUE
BY *James Y. Oldshue*

METHOD OF MAKING AN INFLATABLE TUBE WITH AN ELASTOMERIC INFLATING VALVE

This is a continuation of U.S. Pat. Ser. No. 750,716, filed June 8, 1968, now abandoned, which is a substitution for U.S. Pat. Ser. No. 514,174, filed Dec. 13, 1965, now abandoned.

The invention covers a method of making an inflatable elastomeric tube by removing the metal parts of the metal-core valve in a typical production inner tube for trucks, tractors, or automobiles, and bonding into the tube an all-elastomeric inflating valve.

Figure 3:
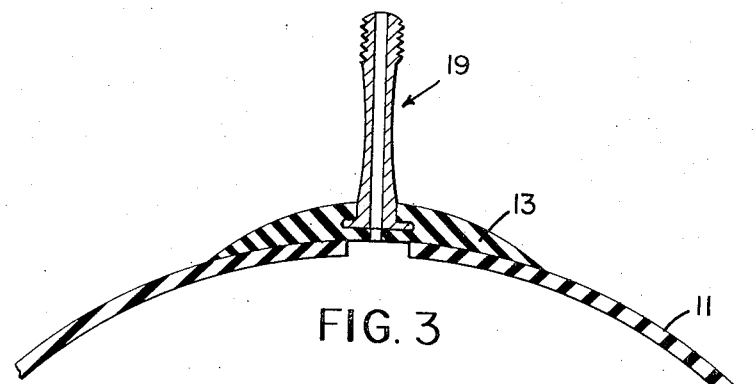
Figure 1:
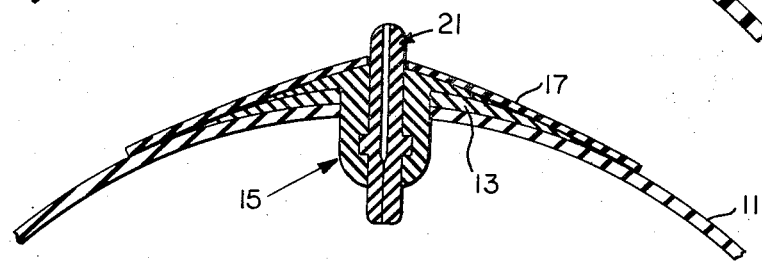
Figure 2:
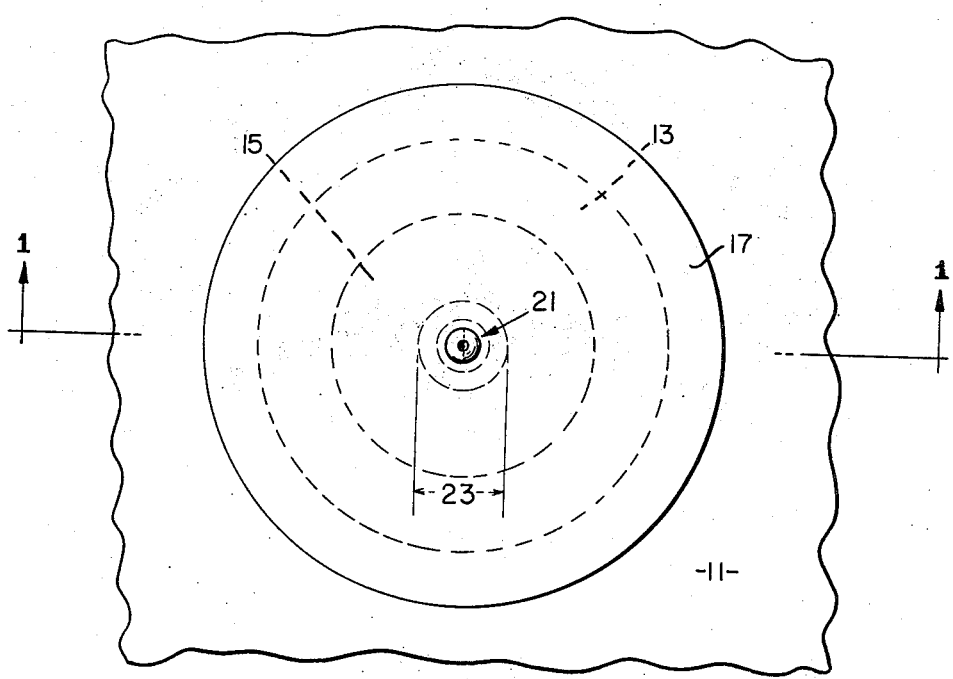

FIG. 1 is a cross section view of the final assembly of the finished tube with the all-elastomeric valve installed. FIG. 2 shows a top view of the finished tube and valve, and shows a typical size for the hole cut for inserting the new all-elastomeric valve. FIG. 3 shows the original metal core containing valve which is bonded to the tube prior to the installation of the all-elastomeric valve by the method described herein.

This invention pertains to large size inflatable tubes, which are typified by having a metal flange on the metal portion of the metal-core inflating valve, said metal flange being imbedded in the relatively thick elastomeric valve base, 13, which is bonded to the tube, 11, during manufacture. Metal-core valves are needed for present heavy duty tubes to withstand the pressure and temperature during the curing process, and to withstand the forces and stresses of the tube when in use.

To use these tubes for sport or play, the metal parts of the valve must be either covered or removed to prevent severe cuts or lacerations.

Presently available all-elastomeric inflating valves, 15, shown in FIG. 1 consist of an inwardly protruding barrel, an outwardly extending nipple, and a thin flange. Presently available inner tubes are designed to be inflated inside a confining casing. The flange of the all-elastomeric inflating valve is also designed to be a part of a confined inflation bladder.

This invention discloses a method of manufacturing a tube from a commercially produced inner tube and a commercially available all-elastomeric inflating valve to make a satisfactory tube which can be inflated without a confining casing, and which will withstand the severe stretching and elongation caused by the method of inflation, and also the extreme stretching and elongation caused by one or several persons using them in diverse manners.

When the metal-core of the inner tube inflating valve has a flange imbedded in the elastomeric base, it is extremely difficult to remove the metal core, and not either remove most of the base, or have a hole that is so large that the thin flange of the all-elastomeric inflating valve cannot be bonded properly to the tube. The obvious method of making this tube is to remove the metal portion of the valve without any undue care, cover this over with a heavy-duty elastomeric patch, and make a hole of the correct size in another portion of the tube into which the barrel of the all-elastomeric inflating valve can be inserted. This does not give a long lasting product when used in beach, pool, or water recreation. Bonding the all-elastomeric valve to the remaining base portion of the original metal containing valve allows a satisfactory bond to be obtained that will withstand the stretching due to inflation outside of a confining casing.

The manufacturing method described here pertains to removing the metal core of the original valve by very carefully making a hole around the metal flange, said hole being essentially the size of the barrel of the all-elastomeric valve, 15. The flange of the all-elastomeric valve, 15, is bonded to the remaining base portion of the original valve, 13. For extra protection, an additional thin elastomeric piece, 17, larger than the flange of the all-elastomeric valve, and having a central hole through which the outwardly extending nipple may protrude, may be bonded over the flange of the all-elastomeric valve, 15.

I claim:

1. A method of making an elastomeric tube made with an all elastomeric inflating valve, said valve installed by the steps of first bonding in a mold with heat and pressure, a metal core containing valve with a rubber base flange said metal core containing valve being previously made by a molding technique, removing the metal core by means of a suitable cutting technique, leaving a hole of essentially circular shape slightly larger than the diameter of the internal body of the all elastomeric valve, inserting said elastomeric valve, said elastomeric valve having a flange to fit over the flange of the original metal core containing valve, bonding said flange of the elastomeric valve to the flange of the remaining flange of original metal core containing valve.

2. A method of making an elastomeric tube as in claim 1, in which the bond between the flange of the elastomeric valve and the rubber flange of the original metal core containing valve is made by the steps of,
   a. coating the flange of the elastomeric valve with a cement containing an unvulcanized elastomer, and
   b. coating the flange of the original metal core containing valve with a bonding cement, and,
   c. Pressing the two surfaces together with a suitable roller, and
   d. allowing sufficient time at ambient temperature for a bonding to occur, without recourse to heat or pressure.

3. A method of making an elastomeric tube as in claim 1, in which an elastomeric washer, substantially circular, is bonded to cover and lap over both the rubber flange remaining from the original metal core containing valve, and the flange of the installed elastomeric valve.

4. A method of making an elastomeric tube as in claim 1, in which the maximum thickness of the rubber flange of the metal core containing valve is about the same thickness as the base material of the tube.

5. A method of making an elastomeric tube as in claim 1, in which the thickness of the flange of the all elastomeric valve is substantially less than the thickness of the base material of the tube.

6. A method of making an elastomeric tube as in claim 1, in which the air passageway in the all elastomeric valve is normally closed, and the air passageway in the inflating needle is substantially less than the air passageway in the metal core containing valve first bonded to the tube.

* * * * *